United States Patent Office 3,412,759
Patented Nov. 26, 1968

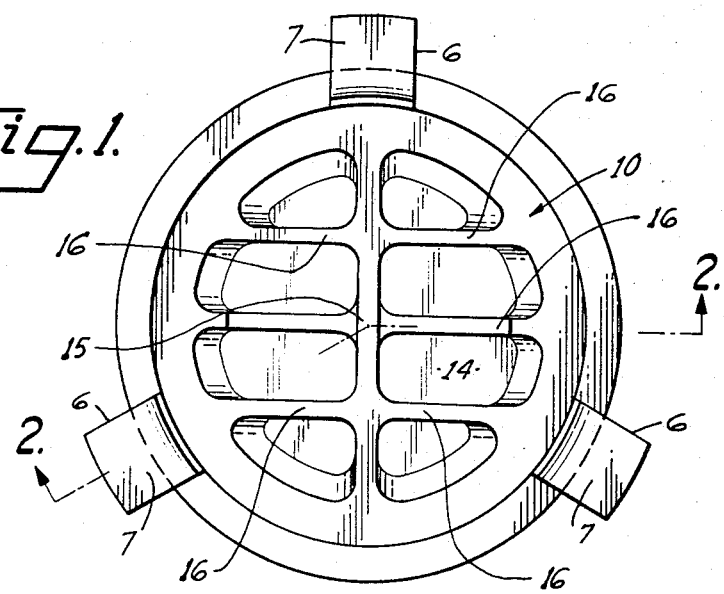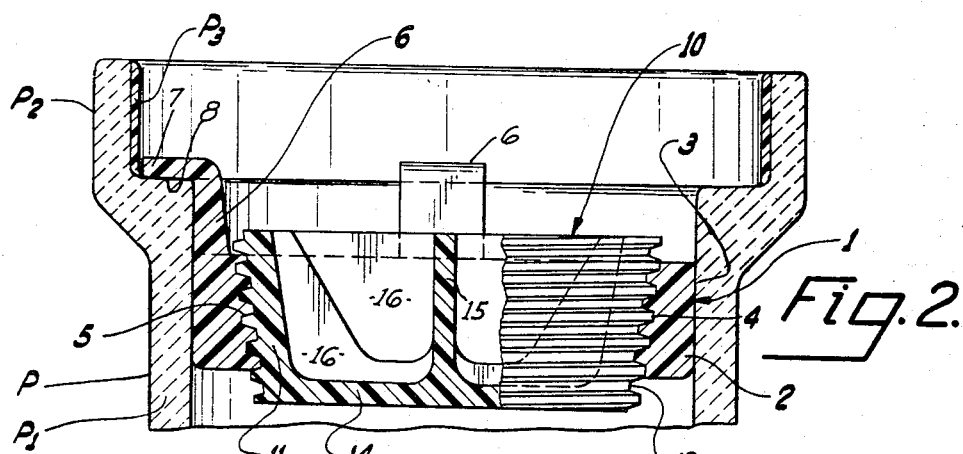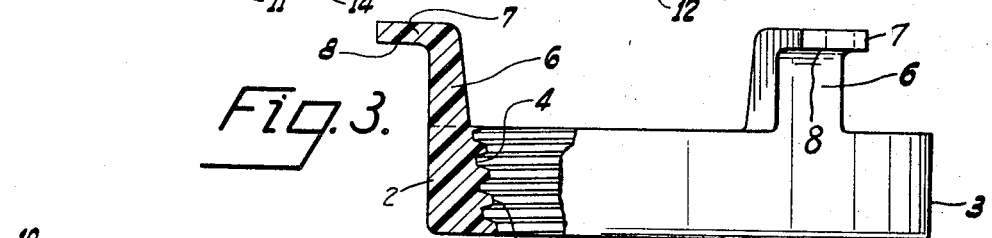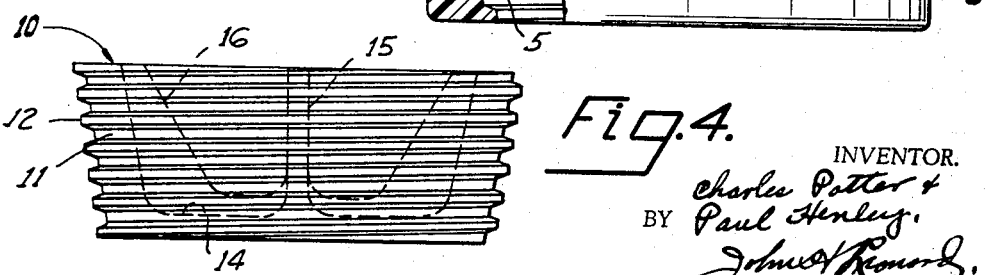

3,412,759
PIPE STOPPER
Charles Potter, Lakewood, and Paul Henley, Chagrin Falls, Ohio, assignors to American Vitrified Products Company, Cleveland, Ohio, a corporation of New Jersey
Filed May 6, 1966, Ser. No. 548,179
9 Claims. (Cl. 138—89)

ABSTRACT OF THE DISCLOSURE

A pipe stopper for conventional vitrified sewer pipe of the bell and spigot type. The stopper comprises a gasket having an annular sealing portion of which the outer wall engages the inner wall of the pipe in spaced relation, endwise of the pipe, to the associated bell.

Gauging means are provided on the gasket so as to limit the insertion of the sealing portion into the barrel of the pipe to a proper position. The sealing portion of the gasket has a tapered internal thread with which an externally threaded, relatively stiff, expanding plug cooperates to expand the sealing portion as the plug is screwed inwardly axially of the gasket. The gauging portion of the gasket is more readily yieldable radially than the annular sealing portion so that substantially all of the expanding force of the plug is applied to the annular sealing portion. The axial length of the assembled plug and gasket are less than the external diameter of the sealing portion of the gasket. The plug has a tool engaging means by which it may be engaged and screwed into the gasket.

---

This invention relates to pipe stoppers and more particularly to pipe stoppers for plugging the barrels of pipes of the bell and spigot type adjacent the bells thereof.

For the purposes of illustration the invention is described as applied to vitrified sewer tile of the bell and spigot type wherein its advantages are most pronounced, its use for other purposes being apparent from the illustrative example.

In the laying of main line sewers a common practice is to provide in the main line a number of tap-ins for subsequent connection of lateral sewer lines to houses which are expected to be built at an indefinite time in the future. These tap-ins generally comprise small barrel portions extending laterally of the main pipes and terminating in bells adapted to receive the spigot ends of small lateral bell and spigot sewer pipes. The laterals are not laid until such houses are built and it is necessary that the tap-ins be plugged awaiting such time.

Stoppers presently used for this purpose are usually of a temporary type which are to be removed when the laterals are subsequently laid.

Also, in the lateral pipelines to houses, the pipes are laid with the bells upstream and the upper end of the last upstream bell end must be plugged permanently.

As to the temporary stoppers, the time during which they remain in place before removal may be considerable. As to the permanent stoppers, assuredly they will remain installed for long periods.

However, such stoppers are subjected to the ground acids and to those chemicals which are commonly present in sewage. Obviously, if they are to be removable or remain permanently, they should be free from any metal or parts which can be corroded or deteriorated appreciably by these acids and chemicals.

The prior pipe stoppers do not lend themselves well to temporary fasteners and fittings which have enduring qualities such that they can remain readily removable for long periods.

Generally, the stoppers used today are solid plugs having the exterior configuration of a pipe spigot end and are held in place in the associated bell by extraneous means such as wires and the like secured to the bell. In many instances, they have often been cemented in place. When the time comes for removing such stoppers they are found to be bonded or wedged against the side walls of the bell so tightly that they cannot be removed readily. Generally it is necessary for removal to subject them to pounding to loosen them, or to break the bond, or destroy the stopper itself. However, when a stopper is thus pounded, breakage of the bell often occurs. If the stopper is broken instead of the bell, the fragments thereof are difficult to remove, and quite often by the time the stopper is sufficiently fragmented so that the pieces can be removed, the plastic true up lining of the bell is damaged so badly that an effective seal with the spigot end of a matching pipe cannot be obtained.

The stopper of the present invention is one which comprises only two simple cooperating parts, an expandable gasket and an expander plug. It is so arranged that no parts or fittings of metal or material subject to corrosion by the ground acids and chemicals in sewage are present or exposed. It requires no extraneous fastening devices, the expander plug and gasket themselves being configured so as to provide the necessary seal. The pipe stopper can be removed readily or left permanently in place. It can be produced readily at a very lost cost and consequently is practical for use as a test stopper, a permanent stopper, or a temporary stopper. If used as a temporary stopper, it can be removed without damage to the stopper, bell lining, or pipe, and reused.

The pipe stopper is so arranged that the sealing portion fits into the barrel of the pipe adjacent the bell, instead of in the bell. Hence it can be used on the various commercial makes of bell end pipes, the bells of which are different in shape and style, depending upon the whims of the particular manufacturing source. Since the stopper can be installed in the barrel instead of the bell it can be made of smaller diameter than a bell stopper, wherefore it does not have to withstand as great a total pressure as though it were installed in the bell wherein considerably more area would be exposed to the internal fluid pressures in the pipeline.

Further, due to configuration of the stopper, highly specialized tools are not required for installing or removing it. Instead, an ordinary length of pipe or bar with a diametral notch cut in the end cam be used. Such a device can be fashioned readily at the usual work site if such a device is not at hand.

Various other objects and advantages of the invention will become apparent from the following description wherein reference is made to the drawings, in which—

FIG. 1 is a top plan view of a pipe stopper embodying the principles of the present invention.

FIG. 2 is a vertical sectional view of the stopper and is taken on the plane indicated by the line 2—2 in FIG. 1, a bell and adjacent barrel portion of a tile in which the stopper is installed being shown in operative relation thereto;

FIG. 3 is a front elevation of a gasket of the pipe stopper, part thereof being cut away for clearness in illustration; and FIG. 4 is a front elevation of the expander plug used in connection with the gasket illustrated in FIG. 3.

Referring to the drawings, the pipe stopper 1 comprises a gasket 2 having an annular body with an outer peripheral sealing wall 3 and an inner wall 4. The outer wall 3 preferably is cylindrical and is coaxial with the wall 4. The inner wall 4 defines a central axial passage which tapers from one end of the gasket 2 toward the other end. The wall 4 is internally threaded with a tapered thread 5 extending the entire length of the central passage. The wall 3 is adapted to fit in sealing relation in the barrel portion of a pipe P of the bell and spigot type and which has a barrel portion $P_1$ and a bell portion $P_2$.

It is customary in the case of vitrified pipe of the bell end type to provide on the interior side wall of the bell a true-up lining $P_3$ of relatively stiff setting organic plastic material, the lining generally being molded in situ and permanently bonded to the pipe. These linings provide sealing surfaces which are truly circular in cross section and of proper shape and smoothness to fit a spigot end and form a seal therewith.

In the manufacture of straight pipe, an internal fin or flash usually is produced at the bottom shoulder or wall of the bell, this flash extending radially or axially of the bell, depending upon the type of molds employed.

The same is true for lateral entrances into a pipe, such entrances being, in effect, merely very short lengths of pipe with a bell end and without a spigot at the opposite end, the opposite end being connected to the main pipe in suitable fashion.

This flash is intended to be cut away before firing, but frequently it is not fully removed. Sometimes too deep a cut is made so that the interior pipe diameter is oversize at the internal shoulder of the bell. Again cutaway fragments often fall against and adhere to the pipe wall near where the flash is removed and become fire bonded thereto. It is desirable, therefore, that the main wall 3 of the gasket 2 be disposed in the barrel $P_1$ of the pipe P at a location inwardly away from the bell end beyond, but adjacent to, the location at which the flash occurs. For this purpose, the outer end of the gasket 2 is provided with means which are readily yieldable radially of the gasket so as not to resist outward expansion of the wall 3 and which are adapted to extend outwardly of the gasket and engage the bottom wall of the bell and thereby gauge the inward movement of the body portion axially inwardly of the barrel $P_1$ so that cylindrical wall 3 is adjacent to, but axially inwardly beyond, in a direction away from the bell end of the pipe, the location at which the flash is formed.

In the form illustrated, this gauging means comprises a plurality of ears 6 which extend axially of the gasket and are spaced apart circumferentially thereof. The ears 6 have outwardly extending portions 7 which provide shoulders 8, respectively, which face toward the opposite end of the gasket 2. These shoulders are adapted to engage the bottom wall of the bell $P_2$. The length of the ears, from the lower face of the shoulders toward the wall 3, is such that when the shoulders rest on the bottom wall of the bell $P_2$, the adjacent end of the sealing wall 3 is inwardly of the pipe just beyond the location of flash formation. The gasket is expanded while in this position, so as to effect sealing engagement between the wall 3 and the peripheral wall of the barrel $P_1$. For this purpose, an expander plug 10 is provided. The plug 10 has an annular exterior wall 11 which is exteriorly threaded with a tapered thread 12 complementary to the thread 5 of the gasket.

In order to reduce the weight of, and amount of material required for, the expander plug 10 without appreciably reducing its strength, the plug is provided with an imperforate bottom wall 14 having an outer face flush with one end of the plug and an inner face spaced from the other end of the plug 10. A main rib 15 and lateral ribs 16 are provided for reinforcing the plug 10 so as to give it the required rigidity for expanding the gasket to effect firm sealing engagement between the wall 3 of the gasket with the interior wall of the barrel of the pipe and for resisting buckling by fluid pressure within the pipe.

The plug 10 may be screwed in place for expanding the gasket and for removing the plug 10 therefrom by connecting a tool to the rib 15. Such a tool may comprise a piece of pipe or an iron bar having a transverse slot adapted to receive the rib 15.

When the plug 10 is screwed into the gasket, it expands the gasket 2 to a degree such that a firm seal is provided between the wall 3 and the interior wall of the barrel of the pipe. Since the gasket 2 and plug 10 are exposed only in the barrel and not in the bell of the pipe, a smaller diameter is exposed to the pressure of fluids within the pipe than would be the case were the plug installed in the bell as is customary with prior structures. This seal is adequate to seal against, and resist buckling by the normal pressures present in the case of sewers. The circumferential segregation of the ears 6 and interruption of the portions 7 are important as these features substantially eliminate any resistance to radial expansion of the gasket, thus rendering this gauge portion more yieldable radially of the gasket than the annular sealing portion. It can be appreciated that if the portion 7 were circumferentially continuous, it would develop high resistance to expansion because it would have to be expanded edgewise.

The gasket 2 is preferably of elastomeric material of 40 to 80 Durometer hardness, such as rubber, polyvinyl chloride, ethylene polyvinyl acetate copolymer, or polyurethane.

The plug 10 preferably is much more rigid and may be composed of high density plastic, such as linear high density polyethylene, high impact styrene, and various hard and tough resins which set with great rigidity.

The present pipe plug can accommodate itself to substantial out of roundness and manufacturing deviations from true diameter of pipes of the size for which it is made. For example, in a pipe of six inch inside diameter, the plug can adjust itself to as much as $7/16$ of an inch oversize in diameter or in eccentricity.

The various advantages hereinbefore indicated will be more appreciated when it is realized that in most main line sewers where tap-ins are provided, the tap-ins are exposed in relatively narrow, deep trenches where working space is at a premium. Accordingly, a very simple stopper is required and one that can readily be removed by workmen in the trench.

Having thus described our invention, we claim:

1. A pipe stopper comprising an annular gasket of relatively stiff elastomeric material and having an annular sealing portion with an outer end, an inner end, an outer peripheral sealing wall, and a coaxial inner peripheral wall defining an axially tapered central passage;
   a relatively stiff expander plug having an axially tapered external peripheral wall;
   coaxial complementary axially tapered complementary threads on said internal wall of the annular sealing portion and external wall of the expander operable to effect uniform expansion of the gasket as the expander is screwed thereinto;
   the minimum external diameter of the gasket being greater than the overall axial length of the gasket and plug when the plug is in fully installed position in the gasket;
   said gasket having a gauging portion extending endwise of the gasket outwardly from the outer end of the annular sealing portion;
   said gauging portion being more yieldable radially of the gasket than the annular sealing portion; and
   tool engaging means on and rigid with the plug and accessible endwise of the plug by a tool and adapted to be detachably drivingly connected thereto for rotating the plug and to be detached from the tool while the plug remains in final expanding position in the gasket.

2. The structure according to claim 1 wherein at least the entire exterior surfaces of the expander plug and gasket are of organic plastic material which is highly resistant to deterioration by ground acids and sewage chemical content.

3. A structure according to claim 1 wherein the gauging portion comprises a plurality of resilient ears which are flexible independently of each other, and are arranged in a row extending circumferentially of the gasket and have gauging shoulders, respectively, extending in a radial direction outwardly beyond the outer peripheral wall of the sealing portion and spaced axially of the gasket beyond the outer end of the annular sealing portion of the gasket and facing toward the opposite end of the gasket.

4. A structure according to claim 3 wherein said ears are integral with the gasket.

5. A structure according to claim 4 wherein the entire gasket with its ears comprise a single one-piece structure of elastomeric material and the entire expander plug is a single one-piece structure of rigid organic plastic material.

6. A structure according to claim 1 wherein said expander plug has a stiff annular peripheral wall and an imperforate end wall at one end of the plug and terminating in spaced relation to the other end, and reinforcing ribs integral with said walls are disposed in the space within the annular wall, and one of said ribs is accessible from said other end and provides the tool engaging means.

7. A structure according to claim 3 wherein the axial spacing of the shoulders are such that the shoulders can engage a radially extending bottom wall of the bell of a pipe which wall faces endwise outwardly of the pipe for gauging the insertion of the gasket into the barrel of the pipe to a predetermined position endwise of the pipe.

8. A structure according to claim 1, further characterized in that a sewer pipe having a bell and barrel portion integrally joined thereto is provided, the gauging means rest on the bottom wall of the bell, and the annular sealing portion is disposed in the barrel portion adjacent to the bottom wall of the bell but spaced inwardly endwise of the pipe therefrom.

9. A structure according to claim 1 wherein the gauging portion has shoulder means thereon spaced axially of the gasket beyond the annular sealing portion and extending radially of the gasket outwardly beyond the peripheral sealing wall of said annular portion.

References Cited

UNITED STATES PATENTS

| | | | |
|---|---|---|---|
| 795,319 | 7/1905 | Vanderman | 138—92 X |
| 2,283,672 | 5/1942 | Francis | 138—89 |
| 2,471,301 | 5/1949 | Boosey | 138—89 X |
| 2,975,947 | 3/1961 | Pellett | 138—89 X |

LAVERNE D. GEIGER, *Primary Examiner.*

E. J. EARLS, *Assistant Examiner.*